(12) United States Patent
Balabine

(10) Patent No.: US 12,468,736 B2
(45) Date of Patent: *Nov. 11, 2025

(54) METHOD, APPARATUS, AND COMPUTER-READABLE MEDIUM FOR EFFICIENTLY CLASSIFYING A DATA OBJECT OF UNKNOWN TYPE

(71) Applicant: INFORMATICA LLC, Redwood City, CA (US)

(72) Inventor: Igor Balabine, Menlo Park, CA (US)

(73) Assignee: INFORMATICA LLC, Redwood City, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 18/543,550

(22) Filed: Dec. 18, 2023

(65) Prior Publication Data

US 2024/0232229 A1 Jul. 11, 2024

Related U.S. Application Data

(63) Continuation of application No. 17/518,582, filed on Nov. 3, 2021, now Pat. No. 11,886,467.

(51) Int. Cl.
*G06F 16/00* (2019.01)
*G06F 7/08* (2006.01)
*G06F 16/22* (2019.01)
*G06F 16/28* (2019.01)

(52) U.S. Cl.
CPC ............ *G06F 16/285* (2019.01); *G06F 7/08* (2013.01); *G06F 16/2237* (2019.01); *G06F 16/2264* (2019.01)

(58) Field of Classification Search
CPC .............. G06F 16/2228; G06F 16/245; G06F 16/2453; G06F 16/285; G06F 16/3331; G06F 16/355; G06F 18/211; G06F 18/2111; G06F 18/213; G06F 18/214; G06F 18/2323; G06F 18/24143; G06F 18/40; G06N 20/20; G06N 3/045; G06N 3/08; G06N 5/043; G06T 11/60; G06T 7/11; G06V 10/454
See application file for complete search history.

(56) References Cited

U.S. PATENT DOCUMENTS 10,043,109 B1* 8/2018 Du .......................... G06F 18/22
2021/0295822 A1* 9/2021 Tomkins ............. G06F 16/3338

* cited by examiner

*Primary Examiner* — Shyue Jiunn Hwa
(74) *Attorney, Agent, or Firm* — Reed Smith LLP; Amardeep S. Grewal

(57) ABSTRACT

An apparatus, computer-readable medium, and computer-implemented method for efficiently classifying a data object, including representing the data object as a data object vector in a vector space, each dimension of the data object vector corresponding to a different feature of the data object, determining a distance between the data object vector and centroids of data domain clusters in the vector space, each data domain cluster comprising data domain vectors representing data domains, sorting the data domain clusters according to their respective distances to the data object vector, and iteratively applying data domain classifiers corresponding to data domains represented in a closest data domain cluster in the sorted data domain clusters to the data object.

18 Claims, 19 Drawing Sheets

Represent the data object as a data object vector in a vector space, each dimension of the data object vector corresponding to a different feature of the data object

101

Determine a distance between the data object vector and each of a plurality of centroids of a plurality of data domain clusters in the vector space, each data domain cluster comprising a plurality of data domain vectors representing a plurality of data domains

102

Sort the plurality of data domain clusters according to their respective distances to the data object vector

103

Iteratively apply one or more data domain classifiers corresponding to one or more data domains represented in a closest data domain cluster in the plurality of sorted data domain clusters to the data object

| Model feature | Variable type |
|---|---|
| Data object begins with a letter | categorical |
| Data object begins with a capital letter | categorical |
| Data object begins with a digit | categorical |
| Data object begins with a special character | categorical |
| Data object contains letters | categorical |
| Data object contains digits | categorical |
| Data object contains special characters | categorical |
| Minimal number of tokens | continuous |
| Maximal number of tokens | continuous |
| Minimal data object length | continuous |
| Maximal data object length | continuous |

```
"domain": "dataDomain_DataRule_SSN"
"startsWithLetter": "no"
"startsWithCapital": "no"
"startsWithDigit": "yes"
"startsWithSpecial": "no"
"containsLetters": "no"
"containsDigits": "yes"
"containsSpecials": "maybe"
"minTokens": "1"
"maxTokens": "3"
"minLength": "9"
"maxLength": "11"
```

```
Cluster 0:
dataDomain_DataRule_Amount
dataDomain_DataRule_BirthDate
dataDomain_DataRule_ComputerAddress
dataDomain_DataRule_DriversLicenseCanada
dataDomain_DataRule_DriversLicenseUSA
dataDomain_DataRule_DriverLicenseUK
dataDomain_DataRule_Email Cluster 1:
dataDomain_DataRule_Geocode
dataDomain_DataRule_ComputerAddress
dataDomain_DataRule_PhoneNumber Cluster 2:
dataDomain_DataRule_Age
dataDomain_DataRule_AustriaSVNR
dataDomain_DataRule_CreditCardNumber
dataDomain_DataRule_DenmarkCPR
dataDomain_DataRule_FranceINSEE
dataDomain_DataRule_Geocode
dataDomain_DataRule_Geocode
dataDomain_DataRule_NetherlandsBSN
dataDomain_DataRule_NorwayFSN
dataDomain_DataRule_SSN
dataDomain_DataRule_SSN
dataDomain_DataRule_USANPI
dataDomain_DataRule_BankAccountUSA
dataDomain_DataRule_ITIN_USA Cluster 3:
dataDomain_DataRule_BIC_SWIFT
dataDomain_DataRule_DriverLicenseUK
dataDomain_DataRule_IBAN
dataDomain_DataRule_ItalyCodiceFiscale
dataDomain_DataRule_Job_Position
dataDomain_DataRule_MachineReadablePassport
dataDomain_DataRule_UKNINO Cluster 4:
dataDomain_DataRule_Track1FmtB
```

Fig. 16A

```
Cluster 0:
0.000000  0.142857  2.000000  0.000000  0.428571  0.857143  1.142857
3.714286  22.285714  34.428571
Cluster 1:
2.000000  2.000000  2.000000  0.000000  0.000000  0.000000  1.000000
34.000000  28.000000  76.000000
Cluster 2:
1.666667  2.000000  1.000000  1.333333  0.000000  0.000000  1.333333
3.000000  9.333333  28.000000
Cluster 3:
1.000000  1.000000  1.000000  1.714286  0.857143  0.285714  0.714286  1.000000
4.000000  5.428571  22.142857
Cluster 4:
2.000000  2.000000  0.000000  2.000000  1.642857  0.000000  1.142857  1.000000
1.785714  8.642857  12.000000
```

Fig. 16B

| Sample | Data Domain | Group | Group offset | Domain offset | Confidence |
|---|---|---|---|---|---|
| 076-89-5693 | dataDomain_DataRule_ITIN_USA | 2 | 0 | 0 | 1.00 |
| 190899 1040 | dataDomain_DataRule_DenmarkCPR | 2 | 0 | 1 | 1.00 |
| $944.80US | dataDomain_DataRule_Geocode | 1 | 0 | 0 | 1.00 |
| 4538 070415 | dataDomain_DataRule_AustraliaSVNR | 2 | 0 | 0 | 1.00 |
| 059414Q641 | dataDomain_DataRule_USAPPI | 3 | 0 | 0 | 1.00 |
| 042-03-6483 | dataDomain_DataRule_SSN | 0 | 2 | 0 | 0.85 |
| 69,290 | dataDomain_DataRule_Amount | 1 | 0 | 12 | 0.96 |
| 25,402 | dataDomain_DataRule_Geocode | 4 | 0 | 0 | 1.00 |
| 4B6019904682460607IKMM/NSM | dataDomain_DataRule_TrackiPan3 | 1 | 0 | 0 | 1.00 |
| insurance underwriter | dataDomain_DataRule_Job_Position | 3 | 0 | 3 | 1.00 |
| 7723.97US | dataDomain_DataRule_Geocode | 2 | 0 | 0 | 1.00 |
| 086-99-2931 | dataDomain_DataRule_SSN | 0 | 1 | 19 | 0.68 |
| 420S9185 | dataDomain_DataRule_DriverLicen | | | | |

Fig. 16C

| Number of data object types | Number of samples classified | Number of classification groups | Average number of classification attempts before a first match | | |
|---|---|---|---|---|---|
| | | | with prediction | With prediction and class members ordering | fixed order |
| 51 | 268 | 7 | 10.2 | 7.9 | 25.0 |
| 32 | 31595 | 5 | 6.5 | 3.5 | 14.2 |
| | | Time per sample, msec | 0.006 | 0.008 | 0.02 |

Fig. 17

METHOD, APPARATUS, AND COMPUTER-READABLE MEDIUM FOR EFFICIENTLY CLASSIFYING A DATA OBJECT OF UNKNOWN TYPE

RELATED APPLICATION DATA

This application is a continuation of U.S. Nonprovisional application Ser. No. 17/518,582, filed Nov. 3, 2021, the disclosure of which is hereby incorporated by reference in its entirety.

BACKGROUND

Data objects' classification is a process of associating a data object with one or more data domains. As used herein, data domain is used interchangeably with the terms "domain," "object domain," "type," "data type," "object class," "data class," "data object class," and "class." US Social Security Number (SSN), first name, last name, driver's license number, bank account number are examples of classes with which respective data objects may be associated.

Determination of a data object's domain enables establishment of proper security controls for that data. For example, data masking, or redacting, is an important data management technology which prevents access to sensitive data by unauthorized users. In order to determine what data should be masked, redacted, or encrypted, it is necessary to determine the data domain or class of the data. Data belonging to sensitive data domains (such as social security numbers, telephone numbers, or other personal information) can then be handled appropriately, such as through data masking. Examples of sensitive data domains include social security numbers, names, addresses, and/or credit card numbers.

Data objects' classification is performed by software modules, called classifiers. A classifier can be binary or probabilistic. When presented with a data object, binary classifiers provide a "yes" or "no" answer, while probabilistic classifiers estimate a probability that the data object belongs to a class of data which the classifier recognizes. Since the data domain/classes in which the customers are interested are numerous, there are a large number of classifiers involved in the data discovery (i.e., data domain determination) process.

Data discovery is a core requirement of many solutions in the data integration and the data warehousing space. As indicated above, customers want to know which sensitive information is present in the data stores throughout an enterprise and in the cloud. Customers' desire to locate and protect sensitive information is further exacerbated by the advent of data privacy regulations such as EU GDPR, CCPA in California, SB 220 in Nevada, etc. These privacy regulations establish rights of the consumers to know which information about the individual a business has, request deletion of such information, and to have the information aggregated if the individual would like to transfer her information to another vendor. These regulations also establish stiff penalties in case of personal information disclosure and data breaches.

There are many types of data objects which privacy regulations classify as Personally Identifiable Information (PII) and Personal Health Information (PHI). Such information includes, but is not limited to, person's first and last name, date of birth, postal code, gender, etc. As a matter of fact, 87% of the US population may be identified by a ZIP-5 code, gender and a date of birth. Keeping in mind fiscal consequences of personal data mismanagement, the customers would like to have a good understanding of personal information location.

As discussed above, classification is performed by software modules called classifiers. In large data sets and large collections of documents, the quantity of classifiers required to adequately classify all or most unknown data objects can number in the hundreds. However, because there is no a-priori knowledge about a distribution of the data objects of interest in an unknown data set (such as a set of scanned documents), it is difficult to advantageously order classifiers to improve the efficiency of the classification process. As a result, the classifiers are typically arranged by the user in some arbitrary fashion and are queried in that order. In such an environment, in a case when N classifiers are configured, it takes, on average, approximately N/2 attempts to classify a data object of unknown type (e.g., data domain). In large data sets and/or documents have a large number of varied unknown data types, this can result in a large overhead, in terms of computational overhead and time to classify, to discover all the relevant data domains in the data set.

Accordingly, improvements are needed in systems and methods for classifying data objects of unknown type.

BRIEF DESCRIPTION OF THE DRAWINGS

FIG. 1 illustrates a flowchart for efficiently classifying a data object of unknown type according to an exemplary embodiment.

FIG. 3 illustrates an example of a generic model 300 that can be used to determine feature values of the data object according to an exemplary embodiment.

FIG. 6 illustrates an example of data domain model 600 for a social security number data domain.

FIGS. 16A-16C illustrate examples of various steps of the classification method disclosed herein according to an exemplary embodiment.

FIG. 17 illustrates experimental results comparing the performance of the classification method disclosed herein with previous classification methods that use a fixed order of data domain classifiers according to an exemplary embodiment.

DETAILED DESCRIPTION

Figure 2:
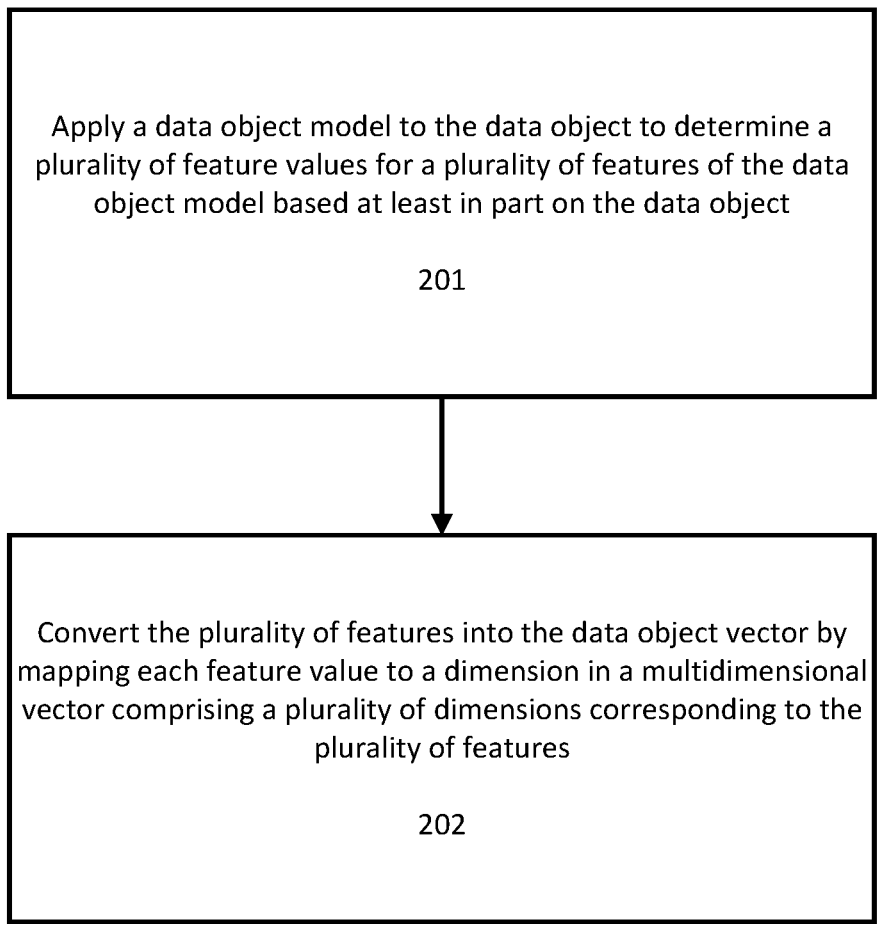
FIG. 2 illustrates a flowchart for representing the data object as a data object vector in a vector space according to an exemplary embodiment.

While methods, apparatuses, and computer-readable media are described herein by way of examples and embodiments, those skilled in the art recognize that methods, apparatuses, and computer-readable media for efficiently classifying a data object of unknown type are not limited to the embodiments or drawings described. It should be understood that the drawings and description are not intended to be limited to the particular form disclosed. Rather, the intention is to cover all modifications, equivalents and alternatives falling within the spirit and scope of the appended claims. Any headings used herein are for organizational purposes only and are not meant to limit the scope of the description or the claims. As used herein, the word "may" is used in a permissive sense (i.e., meaning having the potential to) rather than the mandatory sense (i.e., meaning must). Similarly, the words "include," "including," and "includes" mean including, but not limited to.

Within data classification systems, there are two distinct classification use cases: one-class and multi-class. In the former use case, a data object is associated with a class of data for which a classifier returns a positive response. In a multi-class use case, the classification process continues, and the data object is associated with all classes of data which classifiers respond positively.

Classification can be time a consuming process because many data types of interest have a complex internal structure. For example, the People's Republic of China (PRC) national id holds information about person's gender, date and place of birth, and a check digit which validates integrity of the data object. In the same fashion, a credit card magnetic stripe contains credit card number, credit card expiration date, credit card holder name and special service codes pertinent to that credit card type.

In naïve implementations of data classification, the data objects of unknown type/data domain are passed to all currently configured classifiers directly. In more sophisticated implementations, the data objects instances are first passed to a regular expression based blocking component which purportedly provides a quick check with the purpose of rejecting obviously unmatching data object's instances. The blocking component matches the syntax of the unknown data object using regular expression matching to determine which data objects to block for a particular classifier and which data objects to allow for a particular classifier.

The data objects instances which pass the blocking step are forwarded to the classifier module which either rejects or accepts the association. The data objects accepted by the classifier are further passed to a post-processing step in which semantic disambiguation of the data object is carried out.

The blocking—classification—postprocessing process can work reasonably well when the number of data classes is rather small and the data objects are structurally simple. However, when the number of data classes increases and the structure of the data objects becomes more complex, it becomes very difficult to properly construct the blocking components. On one extreme, the blocking components become too permissive and pass superfluous data objects to classifiers. On the other extreme, the blocking components reject valid representatives of a data class assessed by the classifier. In a case of permissive blocking components, the schema is reduced to the naïve implementation (e.g., one having no blocking component because the blocking component permits all data objects). In a case of restrictive blocking components, a large number of false negative results is observed. These problems can negatively impact the performance of a data discovery process and significantly reduce classification accuracy.

Applicant has discovered a novel data discovery method and system which avoids the above-mentioned drawbacks and which minimizes the number of unsuccessful upfront classification attempts in a single class use case and, in a multi-class classification use case, provides guidance regarding when further classification attempts may be discontinued due to diminishing chances of a success.

The novel methods, apparatuses, and computer-readable media disclosed herein make the blocking step with a recommendation mechanism redundant. Under this new approach, the proposed recommendation mechanism determines an order in which the classification modules should be queried and provides a confidence metric of successful classification for each subsequent suggested classification attempt.

FIG. 1 illustrates a flowchart for efficiently classifying a data object of unknown type according to an exemplary embodiment. At step 101 the data object is represented as a data object vector in a vector space. The vector space can be a multidimensional feature corresponding to a data object model. Each dimension of the data object vector in the vector space corresponds to a different feature of the data object. This step is explained in greater detail below with respect to FIGS. 2-4.

FIG. 2 illustrates a flowchart for representing the data object as a data object vector in a vector space according to an exemplary embodiment. At step 201 a data object model is applied to the data object to determine a plurality of feature values for a plurality of features of the data object model based at least in part on the data object.

The data object model can be a nonparametric lightweight model of the data objects being classified. The data object model can describe simple generic features applicable, without limitation, to all data objects in a current universe of discourse. The features can be expressed in terms of either continuous values that take a value within an interval or categorical variables which can take, for example, three values: "yes," "no," and "maybe." When determining feature values of a data object of unknown type, the categorical and continuous values are assigned a value determined based on the characteristics or attributes of the data object.

FIG. 3 illustrates an example of a generic model 300 that can be used to determine feature values of the data object according to an exemplary embodiment. As shown in FIG. 3, the generic model 300 is an eleven-dimensional model with seven categorical model features and four continuous model features. As indicated above, when determining feature values of a data object of unknown type, the categorical and continuous values are assigned a value determined based on the characteristics or attributes of the data object. Additionally, when evaluating a data object with a data object model, continuous variables' intervals are collapsed (i.e., the maximum and minimum feature value of a feature would be the same value that is determined based on the data object of unknown type).

For example, given an unknown data object "223-13-8310," application of the generic model 300 to the unknown data object would result in the following feature values being determined:

Data object begins with a letter: False
Data object begins with a capital letter: False
Data object begins with a digit: True
Data object begins with a special character: False
Data object contains letter: False
Data object contains digits: True
Data object contains special characters: True
Minimal number of tokens: 1
Maximal number of tokens: 1
Minimal data object length: 11
Maximal data object length: 11

Special characters can include symbols and other non-alphanumeric characters, such as %, #, @, &, !, etc. For example, if the unknown object is a social media handle, then the "Data object begins with a special character" could be true (e.g., @username).

The number of tokens can indicate the number of strings separated by some type of delimenter, such as a space or a dash. For example, the value "3131 121" would have 2 tokens, the value "121313" would have 1 token, and the value "12 1214 131" would have 3 tokens.

When applying a data object model, such as the generic model 300, to a data object of unknown type, any features having continuous values (i.e., having a range of values) can be collapsed to a single value reflecting the corresponding feature value of the data object. For example, the minimal to maximal data object length feature values could have a range for a specific domain, such as 9-11 for social security numbers (e.g., "313125231" or "313-12-5231"). When applying this feature to the unknown data object "223-13-8310," these value would be collapsed to "11," since the unknown data object has 11 characters. The result is that both the minimal data object length and maximal data object length have a value of "11."

The continuous features can also be converted into categorical features by separating certain ranges into categories (e.g., low, medium, high) and the value of the data object can be converted into the appropriate category. The process of converting the continuous dimensions of the model space into categorical can be performed by indicating if the length of the evaluated data object and the observed number of tokens fit into the respective intervals in the original model. This approach can alleviate problems with data objects which length and composition may vary significantly.

Of course, it is understood that other models having different features or greater or lesser numbers of features can be utilized. For example, the model can have two dimensions, five dimensions, or twenty dimensions. The specific model utilized can depend on the user and the context in which data discovery is being performed and/or the universe of discourse. A user or administrator can manually define the model prior to the described process being performed. The model 300 shown in FIG. 3 corresponds to Western (e.g., Latin, Cyrillic) alphabets, but different models can be defined and used for other alphabets.

Returning to FIG. 2, at step 202 the plurality of features are converted into the data object vector by mapping each feature value to a dimension in a multidimensional vector comprising a plurality of dimensions corresponding to the plurality of features.

In the example described above, the eleven feature values are mapped to eleven dimensions in an eleven-dimensional vector, where each dimension corresponds to a feature in the generic model 300. In this case, the multidimensional Vector for Object "223-13-8310"=[False, False, True, False, False, True, True, 1, 1, 11, 11].

Figure 4:
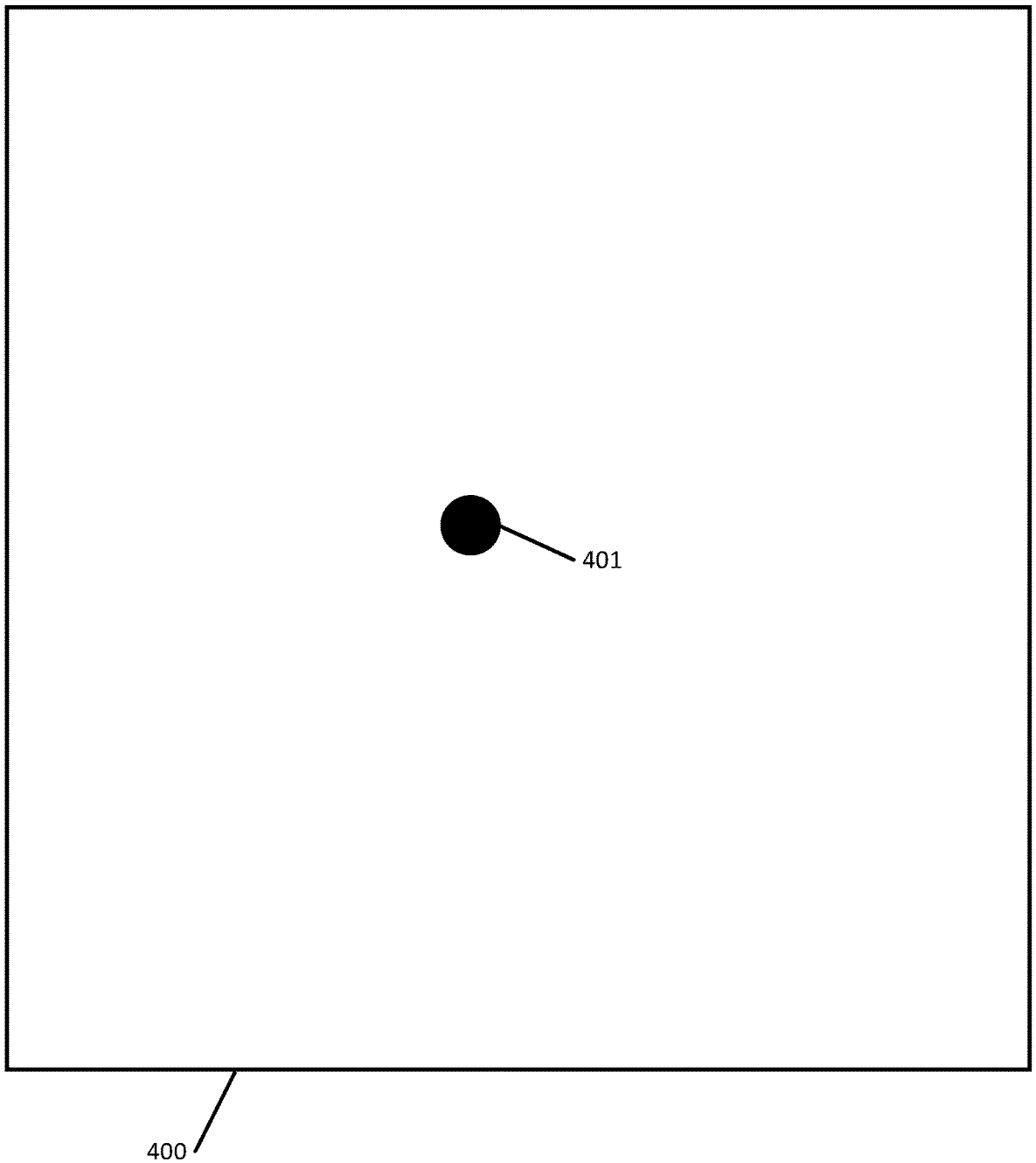
FIG. 4 illustrates an example of a multidimensional vector 401 corresponding to a data object of unknown type in multidimensional vector space 400 according to an exemplary embodiment.

FIG. 4 illustrates an example of a multidimensional vector 401 corresponding to a data object of unknown type in multidimensional vector space 400 according to an exemplary embodiment. For the purpose of illustration, the multidimensional vector 401 and the multidimensional vector space 400 shown in FIG. 4 are two-dimensional, but it is understood that in practice, the multidimensional vectors and the vector space would have a greater number of dimensions (e.g. eleven dimensions for the generic model 300).

Returning to FIG. 1, at step 102 a distance between the data object vector and each of a plurality of centroids of a plurality of data domain clusters in the vector space is determined. Each data domain cluster includes a plurality of data domain vectors representing a plurality of data domains.

Figure 5:
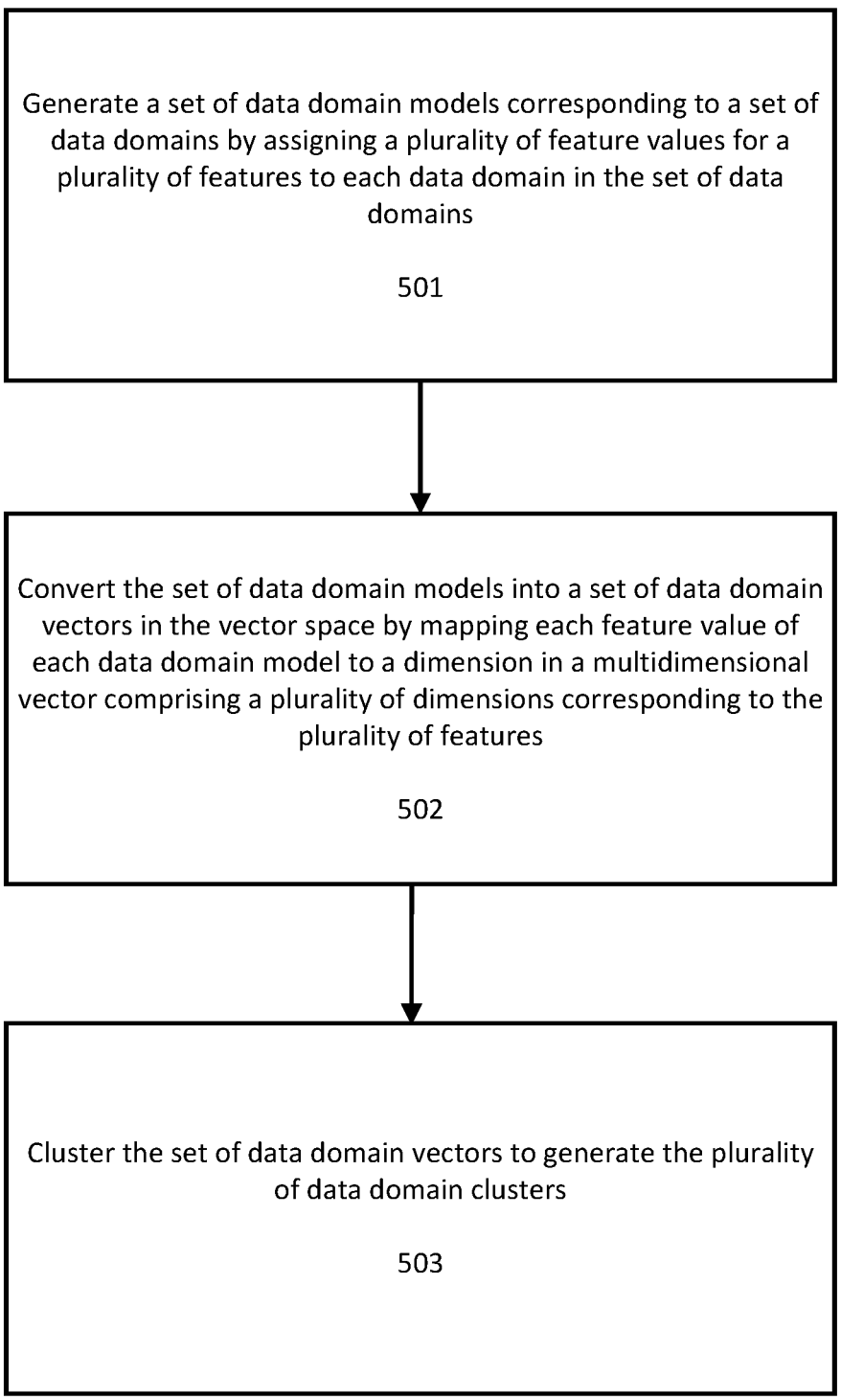
FIG. 5 illustrates a flowchart for generating the clusters of data domain vectors according to an exemplary embodiment.

Prior to determining a distance between the data object vector and each of a plurality of centroids of a plurality of data domain clusters in the vector space, it is necessary to determine the data domain vectors and the data domain clusters in the vector space. FIG. 5 illustrates a flowchart for generating the clusters of data domain vectors according to an exemplary embodiment. The steps shown in FIG. 5 are performed prior to step 102 of FIG. 1.

At step 501 a set of data domain models corresponding to a set of data domains are generated by assigning a plurality of feature values for a plurality of features to each data domain in the set of data domains.

If sample/training is available for a particular domain, then the model (such as generic model 300) can be applied to the data values in each data domain to determine a set of data domain models. The data domain models can be generated automatically by processing the sample data and assigning values to each of the features in the generic model. If sample/training data is not available or if there is insufficient sample/training data, then the data domain models for each data domain can be created manually by assigning feature values to features of the generic model based on the user's knowledge, a domain definition file, or other information describing the domain.

Data domain models can also be adjusted when more data becomes available. For example, a new set of data for a particular domain can result in a wider range of minimum and maximum length or minimum or maximum tokens for the data domain model. Manually defined data domain models can also be adjusted or updated when more data becomes available.

FIG. 6 illustrates an example of data domain model 600 for a social security number data domain. The data domain model can be generated by, for example, parsing and analyzing a data set comprised of known social security numbers and then populating the values of the features based on the parsed values.

Returning to FIG. 5, at step 502 the set of data domain models are converted into a set of data domain vectors in the vector space by mapping each feature value of each data domain model to a dimension in a multidimensional vector comprising a plurality of dimensions corresponding to the plurality of features. This process is similar to the process described for mapping feature values of a data object of unknown type to a multidimensional vector, described above.

Figure 7:
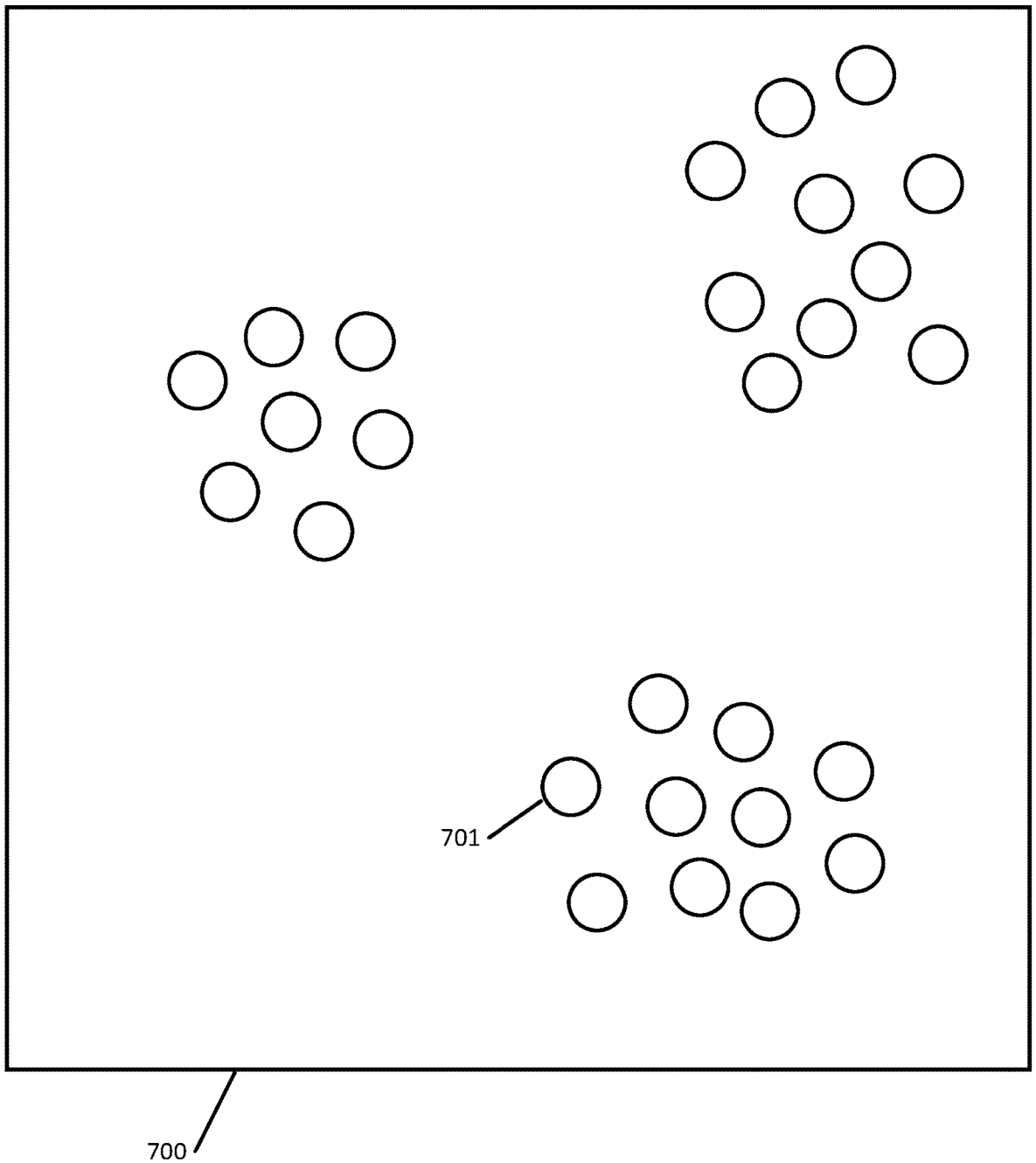
FIG. 7 illustrates an example of a set of data domain vectors in vector space 700.

FIG. 7 illustrates an example of a set of data domain vectors in vector space 700. Each data domain vector, such as data domain vector 701 corresponds to a different data domain model and data domain. Specifically, each data domain vector comprises a multidimensional vector reflecting a plurality of feature values of a plurality of features of a data domain model corresponding to a data domain represented by the data domain vector. Similar to FIG. 4, the multidimensional data domain vectors, such as vector 701, and the multidimensional vector space 700 shown in FIG. 7 are two-dimensional, but it is understood that in practice, the multidimensional vectors and the vector space would have a greater number of dimensions (e.g. eleven dimensions for the generic model 300).

Returning to FIG. 5, at step 503 the set of data domain vectors are clustered to generate the plurality of data domain clusters. The clustering step groups the set of data domain vectors into groupings of data domain vectors, known as clusters. Each cluster includes one or more data domain vectors which correspond to data domain models and data domains having similar or proximate sets of values for features.

A variety of techniques can be used for clustering the training vectors. For example, the density-based spatial clustering of applications with noise (DBSCAN) clustering method can be used due to anticipated presence of non-convex subspaces in the resulting vector space.

Clustering can also be performed using the Balanced Iterative Reducing and Clustering using Hierarchies ("BIRCH") method to cluster the training vectors. BIRCH is a robust clustering algorithm developed for analyzing large volumes of multivariate data. The algorithm is capable of ingesting input data in a continuous fashion. The clustering step includes four steps, described below.

The first step is building a Clustering Feature ("CF") tree—during this stage input data is loaded into a B-tree like structure and data objects are agglomerated in the leaf nodes based on relative Euclidean distance between the data objects. Data objects merging threshold is an input parameter of the BIRCH algorithm and is set initially to a small value. When the input data is normalized to the [0, 1] interval, a relatively small merging threshold value, such as 0.0001 can be used. Additionally, as discussed below, the threshold value can be automatically corrected during a subsequent intermediate step.

The second step is CF tree condensing—this operation can be triggered when the CF tree exceeds a preset size. At this time the samples merging threshold can be recomputed and the CF tree can be rebuilt. A new value of the merging threshold can then be derived from the distance between entries in the existing CF tree.

The third step is global clustering—at this step the BIRCH clustering algorithm applies a regular clustering algorithm to information collected in the CF tree. For example, the BIRCH algorithm implementation can utilize two global clustering options: CF tree refinement and Hierarchical Clustering ("HC"). While HC is capable of producing finer granularity clusters, its run time is significantly longer and memory consumption is significantly higher than that of the CF tree refinement procedure.

The fourth step is cluster matching—during this step input data objects are matched with the clusters produced after the refinement step.

Additionally, clustering methods other than DBSCAN or BIRCH can be used during the clustering step. For example, clustering algorithms such as K-means or DENGRIS can be used to group the data domain vectors into clusters.

In an exemplary embodiment, k-means clustering is used for clustering and Gower distance is used for distance determination. When using k-means clustering, the quality of the constructed clusters can be determined and used to construct better clusters. In particular, since the k-means algorithm takes the number of produced clusters, k, as a parameter, the silhouette coefficient (a measure of how similar an object is to its own cluster compared to other clusters) is used to determine quality of the constructed clusters with various values of k and, opportunistically, over multiple iterations using a fixed value of k. Once the computation is completed, a clustering arrangement with a maximal observed value of the silhouette coefficient is chosen and the centroid vectors of each cluster are computed.

The clustering step can performed once at the onset of the classification process or when the classifiers are added or removed. It is appreciated, that data objects models' instantiation step is independent of the clustering step. The models can be instantiated once upfront in a static fashion and used later for clustering.

Figure 8:
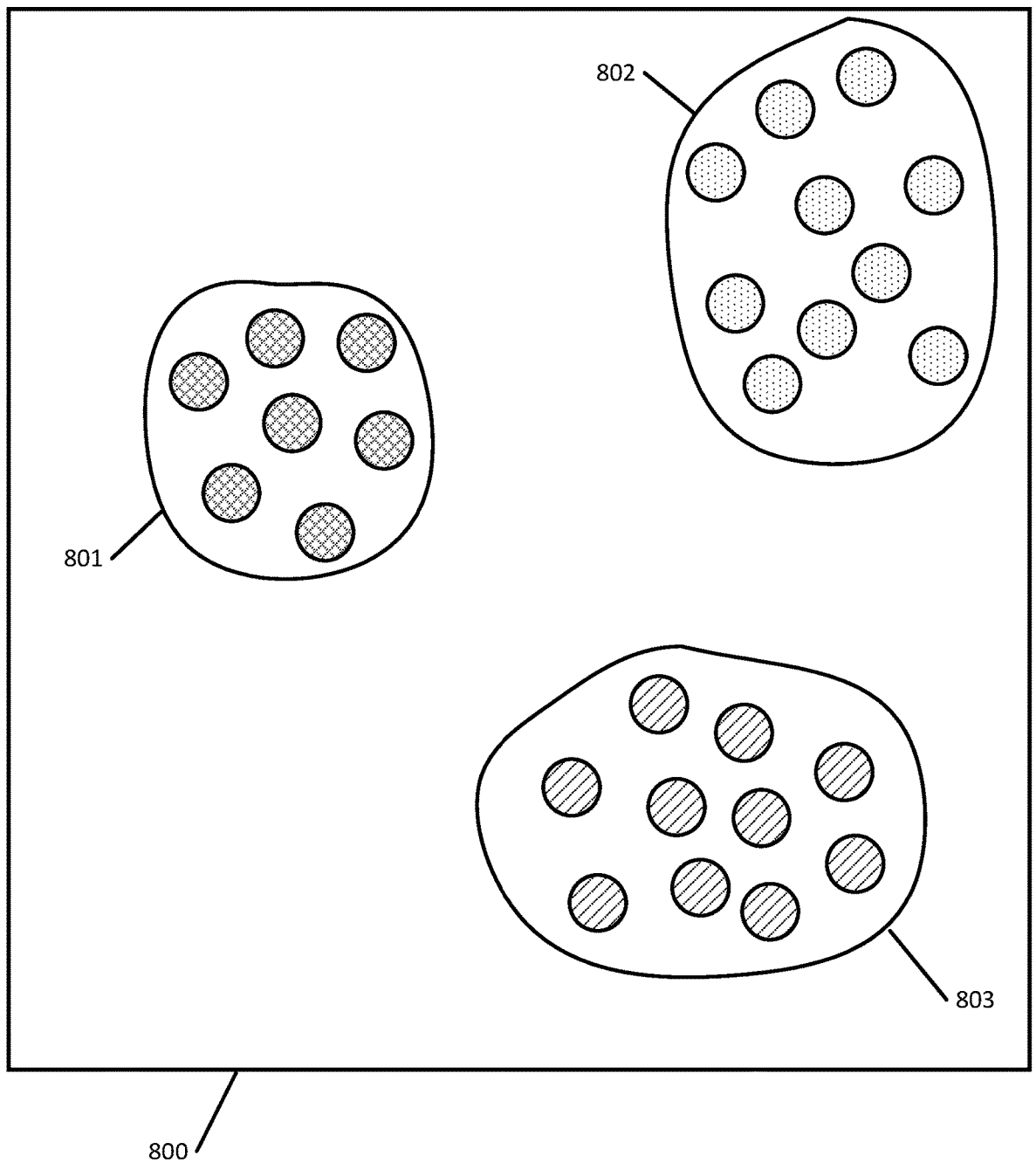
FIG. 8 illustrates an example of generated data domain clusters according to an exemplary embodiment.

FIG. 8 illustrates an example of generated data domain clusters according to an exemplary embodiment. As shown in FIG. 8, the set of data domain vectors in vector space 800 have been grouped into data domain clusters 801, 802, and 803.

Returning to FIG. 1, as explained earlier, at step 102 a distance between the data object vector and each of a plurality of centroids of a plurality of data domain clusters in the vector space is determined, each data domain cluster comprising a plurality of data domain vectors representing a plurality of data domains.

Figure 9:
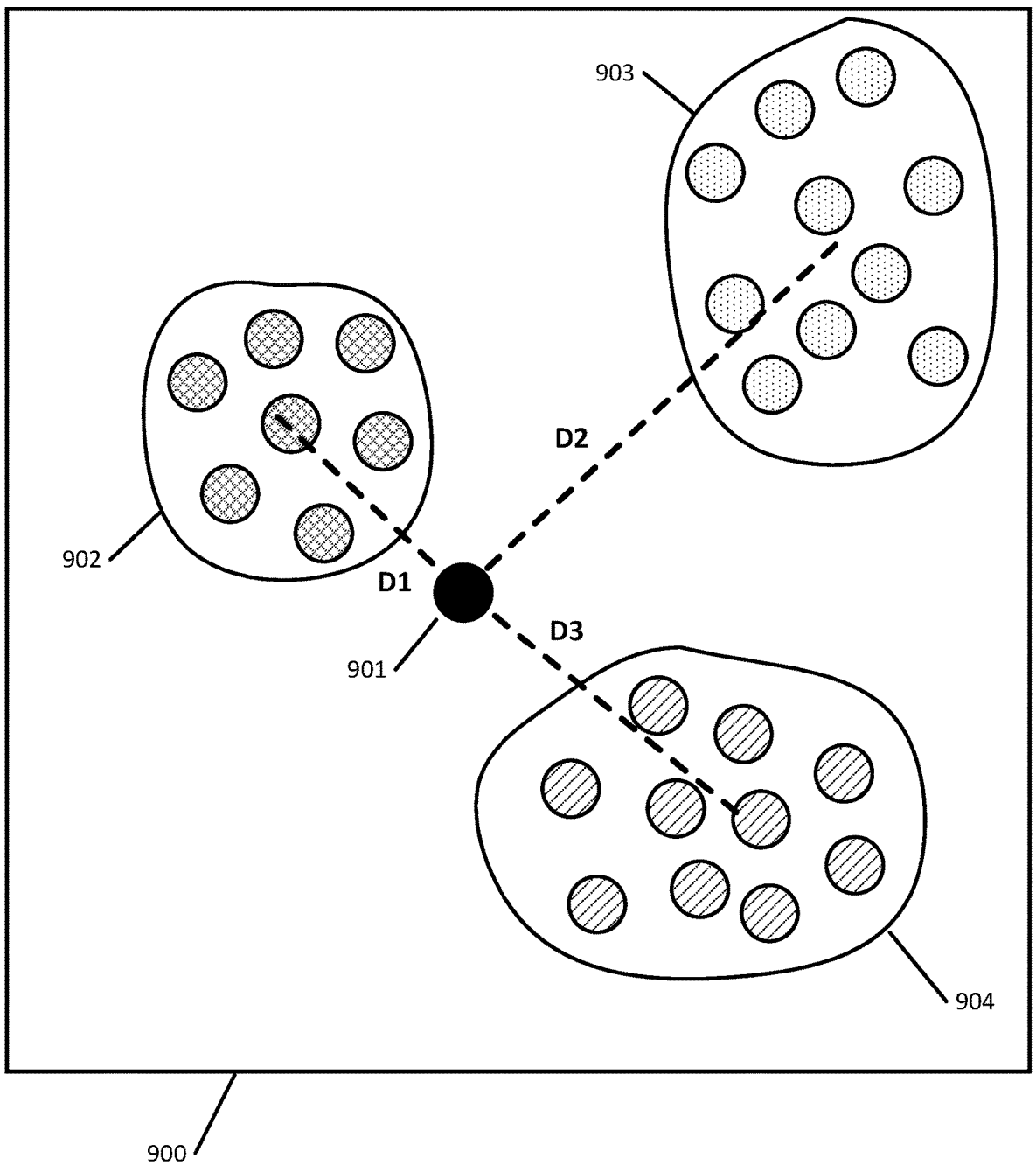
FIG. 9 illustrates an example of the distance determination process according to an exemplary embodiment.

FIG. 9 illustrates an example of the distance determination process according to an exemplary embodiment. As shown in FIG. 9, distance D1 is determined between data object vector 901 and data domain cluster 902, distance D2 is determined between data object vector 901 and data domain cluster 903, and distance D4 is determined between data object vector 901 and data domain cluster 904.

As discussed previously, each of data domain clusters 902, 903, and 904 include data domain vectors clustered according to the process previously described. Additionally, the distances D1, D2, and D3 are computed between the data object vector and the centroids (center of mass) of the data domain clusters 902, 903, and 904. The centroids of the clusters themselves can be computed beforehand after the clustering process but before the distance determination process.

Optionally, the distances can be computed from the data object vector to data domain vectors in the data domain clusters rather than the centroids of the data domain vectors.

For example, the distances can be computed from the data object vector to the closest data domain vectors in each data domain cluster.

Additionally, the distances between the clusters can be precomputed immediately after the clustering step and placed into a corresponding k×k matrix, where k is the number of clusters.

A variety of metrics can be used to compute distance from a data object vector to a cluster. For example, the Hausdorff metric can be to compute distance between a data object vector (corresponding to a data object of unknown type) and the respective clusters of the data domain vectors (corresponding to data domain models).

Another distance measure that can be utilized to compute distance from a data object vector to a cluster is the Mahalanobis distance. The Mahalanobis distance is a measure of the distance between a point P and a distribution D. An origin point for computing this measure is at the centroid (the center of mass) of each of the clusters. The first coordinate axis when computing this distance extends along the spine of the data domain vector within each cluster, which is any direction in which the variance is the greatest. The second coordinate axis, extends perpendicularly to the first axis, with the origin point at the intersection of first axis and the second axis. The Mahalanobis distance for each data object vector and each cluster is the distance measured relative to coordinate axes and from the data object vector to the origin point of the vector space.

Typically, the feature space for data domain models and data object models will include categorical variables. Since the feature space includes categorical variables, a specialized metric, such as Gower distance, can be used. For example, the k-means clustering algorithm can be used for clustering and the Gower metric can be used as a distance measure.

To alleviate problems with data objects which length and composition may vary significantly, the continuous dimensions of the model space can be transformed into categorical dimensions by indicating if the length of the evaluated data object and the observed number of tokens fit into the respective intervals in the original model.

Returning to FIG. 1, at step 103 the plurality of data domain clusters are sorted according to their respective distances to the data object vector. Once the distance to the clusters' centroids is computed, the clusters are sorted by the closeness to the data object vector, with the initial cluster being closest to the data object vector and each subsequent cluster being the next-closest to the data object vector. The resulting list of clusters indicates in which order the evaluated data object should be presented to the classifiers corresponding to the various data domains in the clusters.

Figure 10:
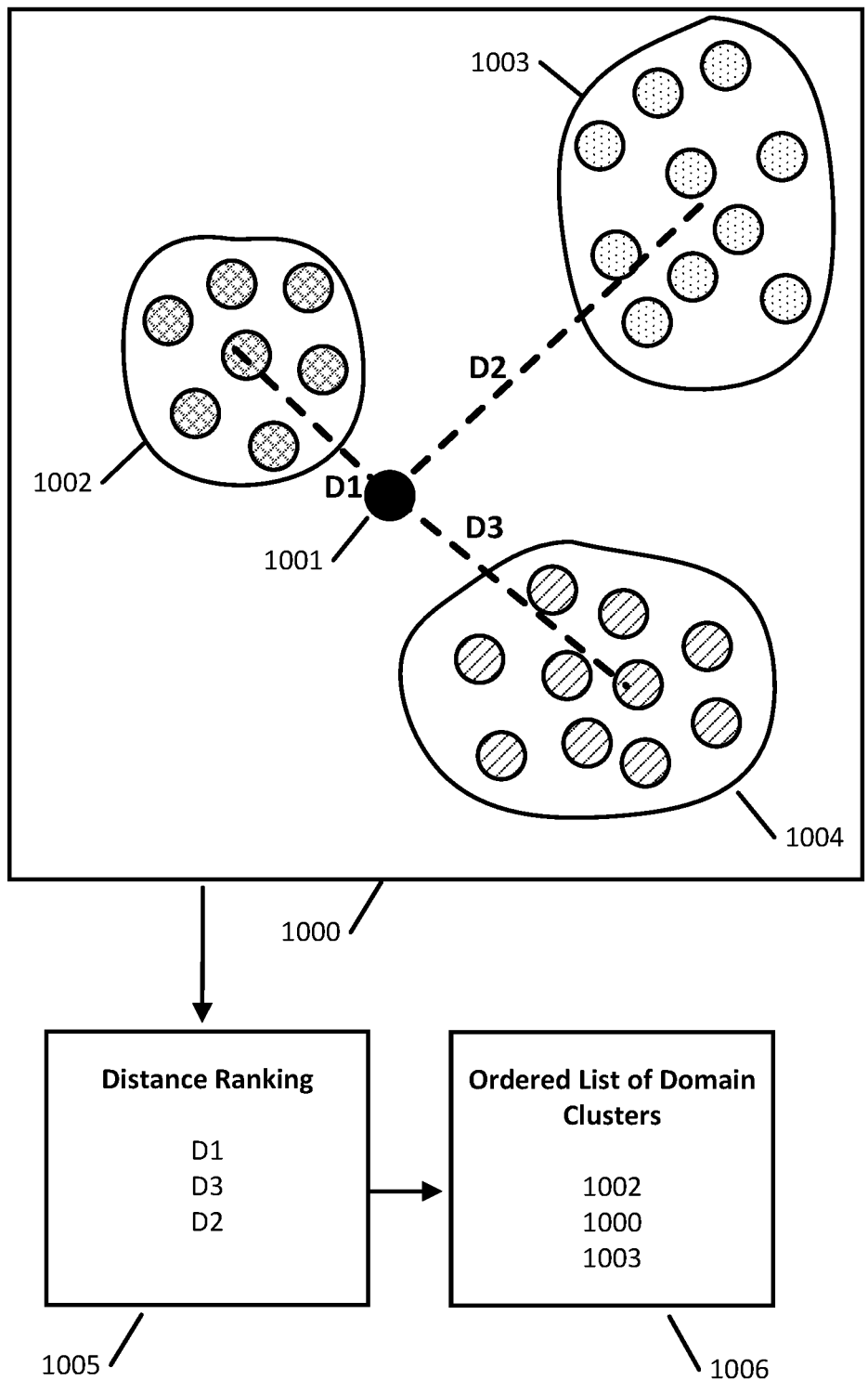
FIG. 10 illustrates an example of the data domain cluster sorting process according to an exemplary embodiment.

FIG. 10 illustrates an example of the data domain cluster sorting process according to an exemplary embodiment. Distance D1 corresponds to the distance between data object vector 1001 and data domain cluster 1002 in vector space 1000, distance D2 corresponds to the distance between data object vector 1001 and data domain cluster 1003 in vector space 1000, and distance D3 corresponds to the distance between data object vector 1001 and data domain cluster 1004 in vector space 1000.

As shown in box 1005 of FIG. 10, the distances are sorted from smallest to largest, resulting in the ordering D1 (closest/smallest), D3, and D2 (farthest/largest). Box 1006 indicates the corresponding ordered list of domain clusters based on the determined distances. The list of clusters in box 1006 indicates the order in which the unknown data object should be presented to the classifiers corresponding the domains associated with each of the clusters. In particular, the system will evaluate the data object of unknown type for membership in the domains corresponding to domain vectors in domain cluster 1002 first, and then will evaluate the data object of unknown type for membership in the domains corresponding to domain vectors in domain cluster 1000. If the domain of the unknown data object is still not determined, the system can evaluate the data object of unknown type for membership in the domains corresponding to domain vectors in domain cluster 1003.

Returning to FIG. 1, at step 104 one or more data domain classifiers corresponding to one or more data domains represented in a closest data domain cluster in the plurality of sorted data domain clusters are iteratively applied to the data object. As explained below, this step can include iteratively applying the one or more data domain classifiers corresponding to the one or more data domains represented in a closest data domain cluster in the plurality of sorted data domain clusters to the data object until either the data object is successfully classified or until all data domain classifiers corresponding to all data domains represented in the closest data domain cluster have been applied to the data object.

Figure 11:
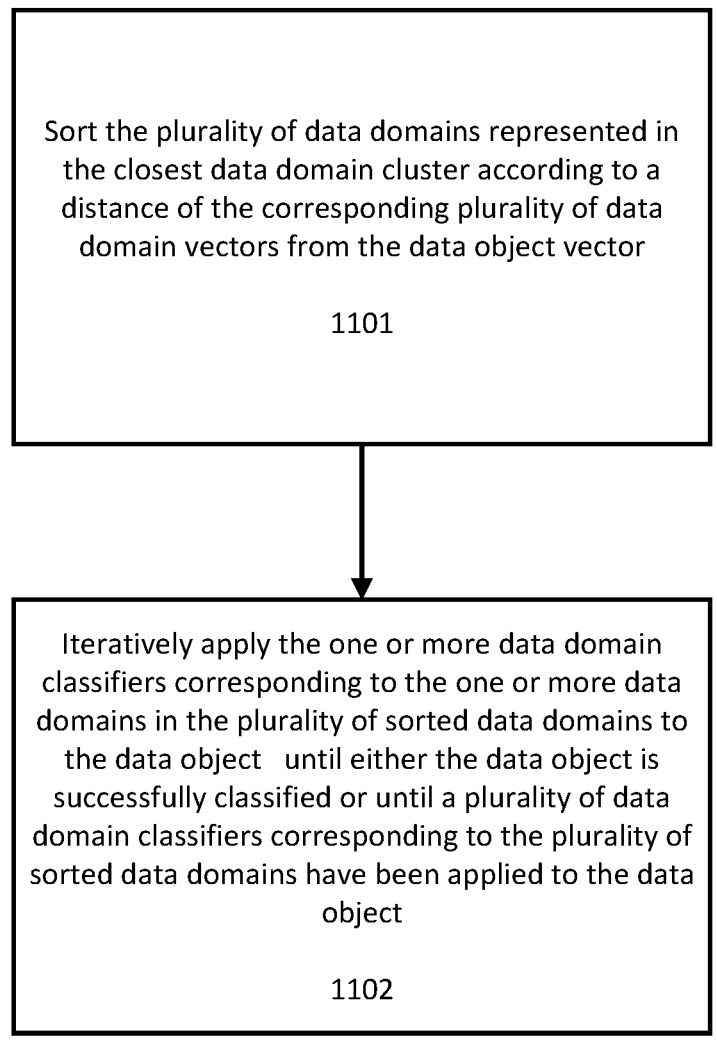
FIG. 11 illustrates a flowchart for iteratively applying data domain classifiers corresponding to data domains represented in a closest data domain cluster in the plurality of sorted data domain clusters to the data object until either the data object is successfully classified or until all data domain classifiers corresponding to all data domains represented in the closest data domain cluster have been applied to the data object according to an exemplary embodiment.

FIG. 11 illustrates a flowchart for iteratively applying data domain classifiers corresponding to data domains represented in a closest data domain cluster in the plurality of sorted data domain clusters to the data object until either the data object is successfully classified or until all data domain classifiers corresponding to all data domains represented in the closest data domain cluster have been applied to the data object according to an exemplary embodiment.

At step 1101 the plurality of data domains represented in the closest data domain cluster are sorted according to a distance of the corresponding plurality of data domain vectors from the data object vector. At step 1102 the one or more data domain classifiers corresponding to the one or more data domains in the plurality of sorted data domains are iteratively applied to the data object until either the data object is successfully classified or until a plurality of data domain classifiers corresponding to the plurality of sorted data domains have been applied to the data object.

Figure 12:
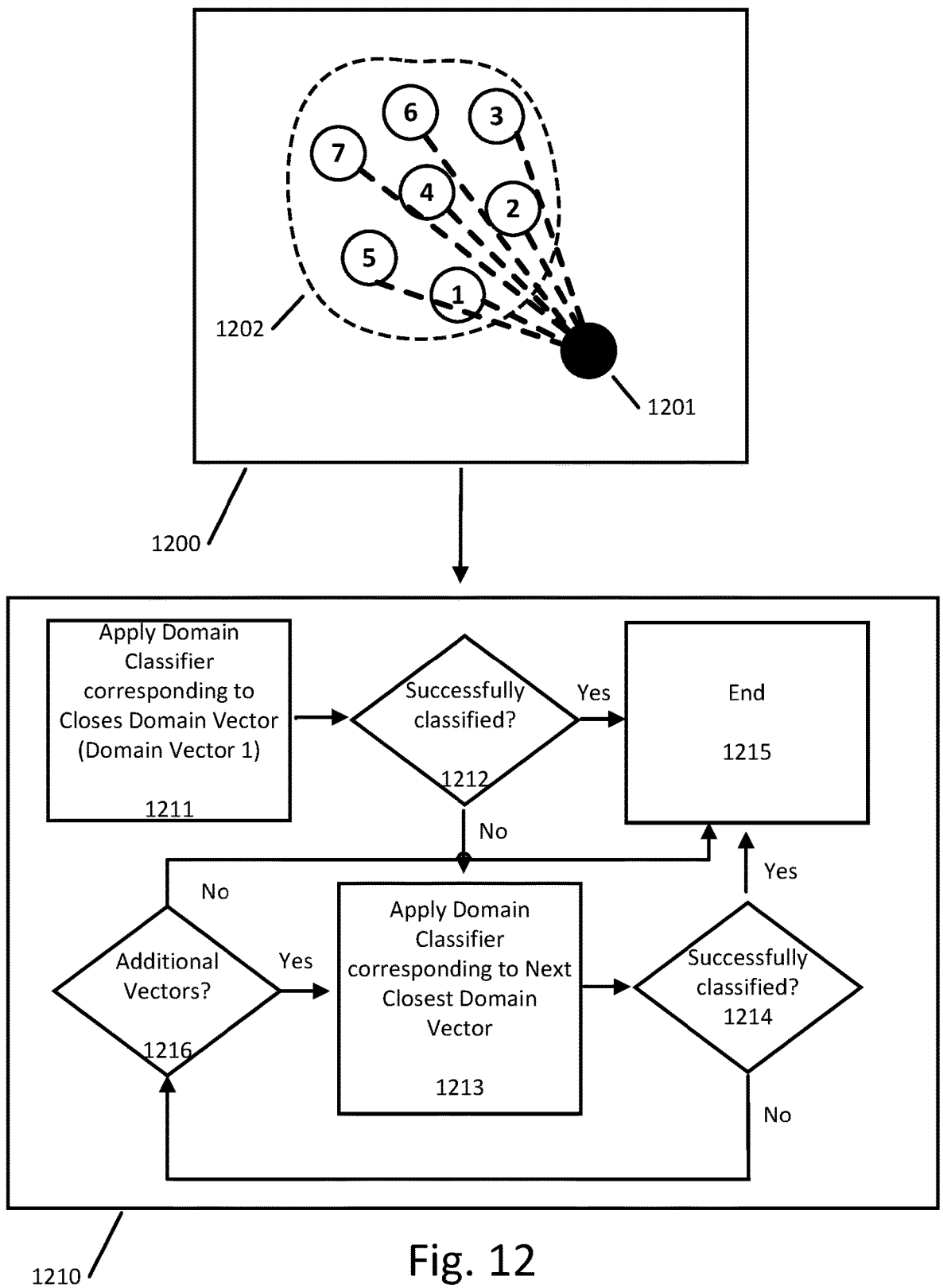
FIG. 12 illustrates an example of the sorting process and a process flow diagram for iteratively applying data domain classifiers corresponding to data domains represented in a closest data domain cluster in the plurality of sorted data domain clusters to the data object according to an exemplary embodiment.

FIG. 12 illustrates an example of the sorting process and a process flow diagram for iteratively applying data domain classifiers corresponding to data domains represented in a closest data domain cluster in the plurality of sorted data domain clusters to the data object according to an exemplary embodiment.

Vector space 1200 shows the result of the sorting process based on the distance between the individual data domain vectors in closest data domain cluster 1202 and data object vector 1201. Box 1210 indicates the process flow for iteratively applying data domain classifiers corresponding to data domains represented in the closest data domain cluster 1202 to the data object.

At step 1211 a domain classifier corresponding to the closest domain vector (labeled 1 in vector space 1200) is applied to the data object. At step 1212 it is determined whether the data object has been successfully classified. If the data object has been successfully classified then at step 1215 the process ends. Otherwise, at step 1213 the domain classifier corresponding to the next closest domain vector (labeled 2 in vector space 1200) is applied to the data object. At step 1214 it is determined whether the data object has been successfully classified. If so, then the process ends at step 1215. Otherwise, at step 1216 it is determined whether there are additional domain vectors in the closest cluster 1202. If there are no additional domain vectors in the closest cluster 1202, then the process ends at step 1215. Otherwise, step 1213 is repeated with the domain classifier corresponding to the next closest domain vector (labeled 3 in vector space 1200). One or more of steps 1213, 1214, and 1216 are then repeated until the data object is successfully classified or all of the classifiers corresponding to all of the vectors in the closest data domain cluster 1202 are evaluated.

Figure 13:
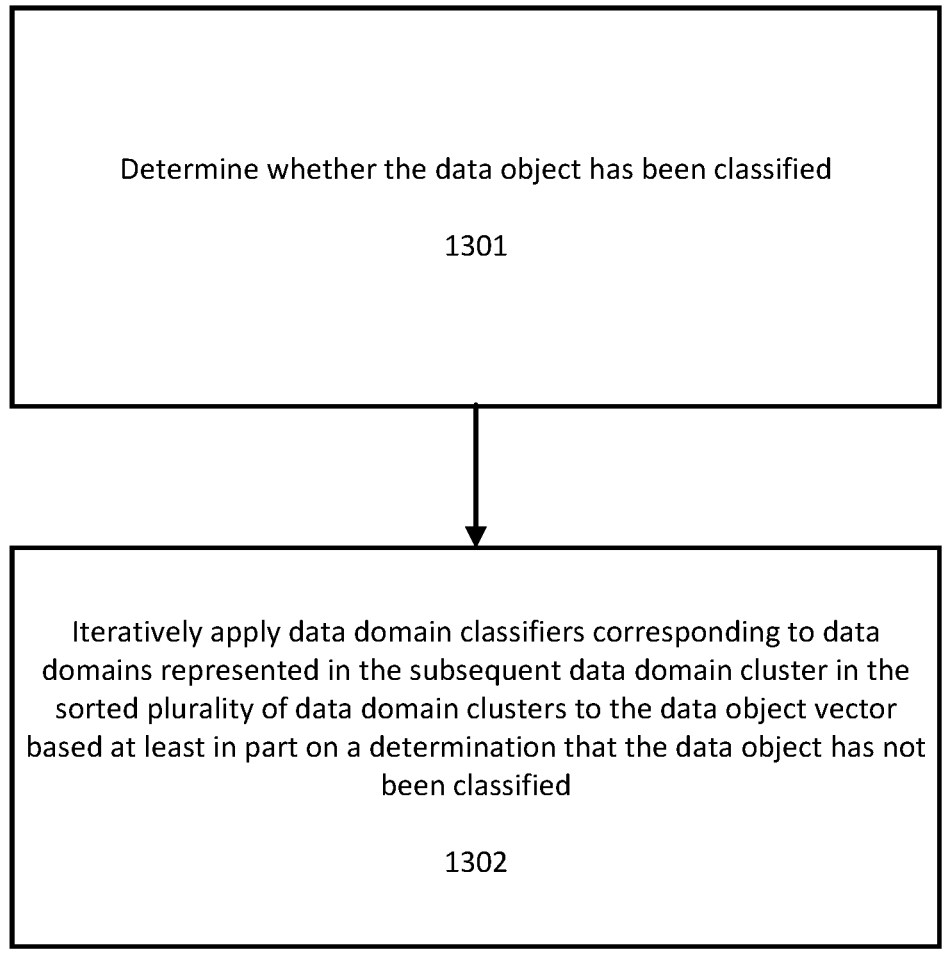
FIG. 13 illustrates a flowchart for applying classifiers corresponding to data domains represented in the next closest data domain cluster to the data object according to an exemplary embodiment.

In some scenarios, the classifiers corresponding to data domains and data domain vectors in the closest cluster may not successfully classify the data object. In this case, the evaluation process advances to the next closest cluster (e.g., in the sorted data domain clusters). FIG. 13 illustrates a flowchart for applying classifiers corresponding to data domains represented in the next closest data domain cluster to the data object according to an exemplary embodiment.

At step 1301 it is determined whether the data object has successfully been classified after all classifiers corresponding to all data domain vectors in a cluster have been applied. Successful classification can be determined based at least in part on the classification scores that are generated by the classifiers when applied to the data object. If the classification score exceeds a predetermined classification threshold, then the data object is successfully classified as belonging to the data domain of the classifier for which the classification score exceeds the predetermined classification threshold.

At step 1302 data domain classifiers corresponding to data domains represented in a subsequent (i.e., next-closest) data domain cluster in the sorted plurality of data domain clusters are iteratively applied to the data object vector based at least in part on a determination that the data object has not been successfully classified.

The step of iteratively applying data domain classifiers corresponding to data domains represented in a subsequent (i.e., next closest) data domain cluster in the sorted plurality of data domain clusters to the data object can follows the process flow shown in FIG. 11 and/or box 1210 of FIG. 12. Specifically, the domain vectors in the subsequent data domain cluster can be sorted based on distance to the data object vector and domain classifiers corresponding to the domain vector can be iteratively applied to the data object until the data object is successfully classified or all classifiers corresponding to all domain vectors in the subsequent data domain cluster have been applied.

Besides indicating a classification order, the proposed method can provides a probability of a successful classification by the classifiers in the subsequent clusters. This probability can be computed as a ratio of the distance between the centroid vector of the first selected cluster and the centroid vectors of the subsequent clusters. This property, when treated as a probability of a successful classification, enables the user to set a threshold after which subsequent classification attempts may be discontinued.

Figure 14:
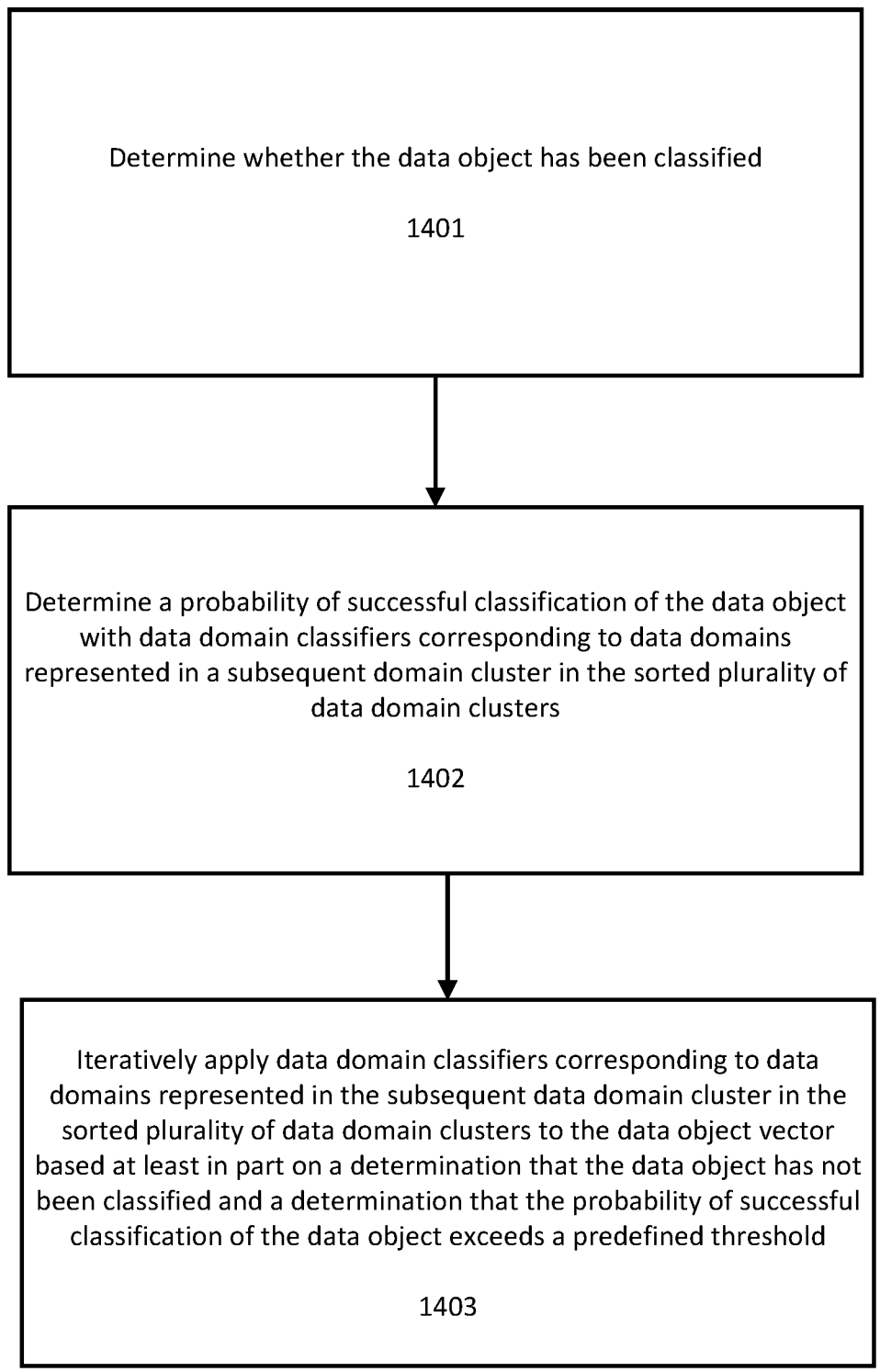
FIG. 14 illustrates another flowchart for applying classifiers corresponding to data domains represented in the next closest data domain cluster to the data object based at least in part on a probability of successful classification according to an exemplary embodiment.

FIG. 14 illustrates another flowchart for applying classifiers corresponding to data domains represented in the next closest data domain cluster to the data object based at least in part on a probability of successful classification according to an exemplary embodiment.

At step 1401 it is determined whether the data object has successfully been classified after all classifiers corresponding to all data domain vectors in a cluster have been applied. Successful classification can be determined based at least in part on the classification scores that are generated by the classifiers when applied to the data object. If the classification score exceeds a predetermined classification threshold, then the data object is successfully classified as belonging to the data domain of the classifier for which the classification score exceeds the predetermined classification threshold.

At step 1402 a probability of successful classification of the data object with data domain classifiers corresponding to data domains represented in the subsequent domain cluster is determined. As discussed above, this probability can be a confidence score and can be computed as a ratio of the distance between the centroid vector of the first selected cluster and the centroid vectors of the subsequent clusters. Of course, the probability can be determined in other ways. For example, the probability or confidence score can be based on one or more of classifier scores for a domain cluster for which classifiers have already been applied, the distance between the previous domain vector cluster to the data object vector, and/or the distance between new domain vector clusters and the data object vector.

At step 1403 data domain classifiers corresponding to data domains represented in a subsequent data domain cluster in the sorted plurality of data domain clusters are iteratively applied to the data object vector based at least in part on a determination that the data object has not been successfully classified and a determination that the probability of successful classification of the data object exceeds a predefined probability threshold. The predefined probability threshold can be set by a user, set to some default value, and/or computed automatically based upon the underlying data domains and unknown data objects. For example, in certain contexts, a low threshold can be used to ensure that all classifiers are exhausted before determining that that the data object cannot be classified. In other contexts, a higher threshold can be used to preserve computational resources and not devote processing power or resources to applying classifiers that have a low probability of success.

Figure 15:
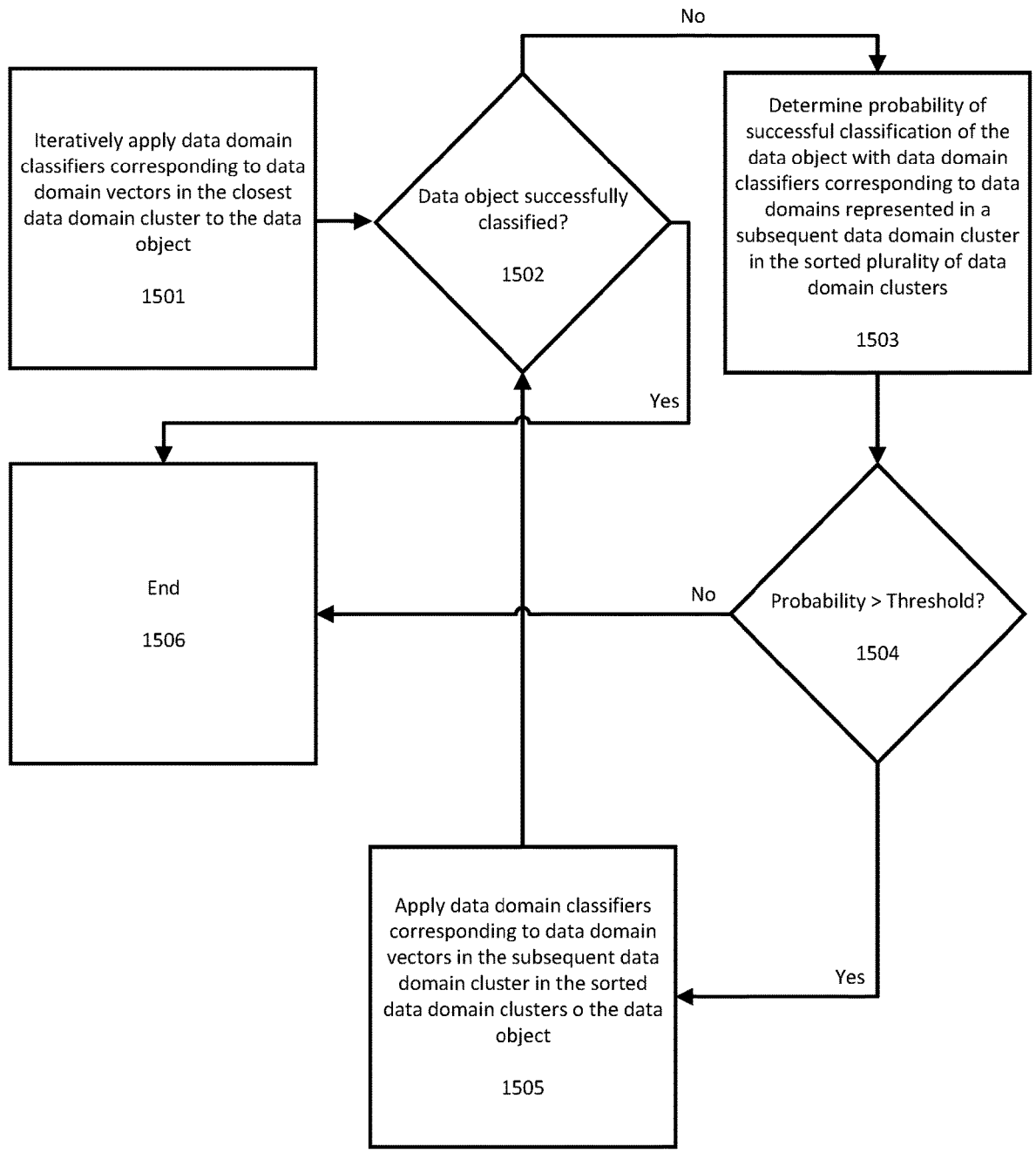
FIG. 15 illustrates a process flow diagram for iteratively applying data domain classifiers corresponding to data domains represented in the data domain clusters in the sorted plurality of data domain clusters to the data object vector according to an exemplary embodiment.

FIG. 15 a process flow diagram for iteratively applying data domain classifiers corresponding to data domains represented in the data domain clusters in the sorted plurality of data domain clusters to the data object vector according to an exemplary embodiment.

At step 1501 data domain classifiers corresponding to data domain vectors in the closes data domain cluster are iteratively applied to the data object. This process is described earlier, such as with respect to FIG. 12, and can include sorting the individual data domain vectors within the cluster and iteratively applying the sorted data domain vectors until the data object is classified or all data domain vectors are exhausted.

At step 1502 it is determined whether the data object has been successfully classified. As discussed earlier, successful classification can be determined based upon classification scores generated by classifiers and predetermined classification thresholds. If the data object has been successfully classified, then at step 1506 the process ends.

If the data object has not been successfully classified (i.e., the data object does not belong to any of the domains corresponding to the previous data domain cluster), then at step 1503 a probability of successful classification of the data object with data domain classifiers corresponding to data domains represented in a subsequent data domain cluster in the sorted plurality of data domain clusters is determined. This probability assessment process is described earlier. In addition to the earlier description, it is noted that if there are no additional data domain clusters in the sorted data domain clusters, then this probability can automatically be set to zero, resulting in the process ending at set 1506.

At step 1504 it is determined whether the probability of successful classification into the domains corresponding to a subsequent (i.e., next-closes) data domain cluster exceeds the predefined probability threshold. If the probability of successful classification does not exceed the threshold, then at step 1506 the process ends.

If the probability of successful classification exceeds the threshold, then at step 1505 data domain classifiers corresponding to data domain vectors in the subsequent (next-closes) data domain cluster in the sorted data domain clusters are iteratively applied to the data object. This process is described earlier, such as with respect to FIG. 12, and can include sorting the individual data domain vectors within the cluster and iteratively applying the sorted data domain vectors until the data object is classified or all data domain vectors are exhausted.

FIGS. 16A-16C illustrate examples of various steps of the classification method disclosed herein according to an exemplary embodiment. FIG. 16A illustrates an example of the data domain vector clustering step. The data domains corresponding to the data domain vectors in each data domain cluster are shown under each cluster. For example, cluster 1 includes a data domain vector corresponding to the data domain "Phone Number." It is important to note that a numeric id assigned to each cluster is transient and may change after each iteration of the clustering step.

FIG. 16B illustrates an example of the centroid vectors for the data domain clusters shown in FIG. 16A. As shown in FIG. 16B, the data domain vectors are grouped into four clusters. The feature values (dimension values) of each of the clusters are also shown. There are eleven data values for each cluster, corresponding to the eleven dimensional generic model 300 shown in FIG. 3.

FIG. 16C illustrates experimental results of applying classifiers for data domains corresponding to data domain cluster 2 in FIG. 16A to sample data objects. The identified data domain for each data object is shown in the figure. The figure illustrates the following values:

Sample—the data object value;
Data Domain—the data domain into which the data object was ultimately classified;
Group—cluster id (for reference only);
Group offset—the order in which the cluster is recommended for matching (0—first, 1—second, . . . );
Domain offset—a position in which a matching data domain was encountered; and
Confidence—a measure of confidence that the sample may be matched to a data domain in this group.

FIG. 17 illustrates experimental results comparing the performance of the classification method disclosed herein with previous classification methods that use a fixed order of data domain classifiers according to an exemplary embodiment.

The table in FIG. 17 includes columns for the number of data object types in a sample set, the number of samples classified in the sample set, and the number of classification groups. Prior to each test run, the samples in each sample set are randomly shuffled.

The table also includes a column for the average number of classification attempts (i.e., classifiers applied) prior to a matching (successful) classification. This column includes sub-column "with prediction," which corresponds to the method disclosed herein of clustering data domains and predicting which cluster will contain a matching domain based upon distance to the data object. This column also includes sub-column "with prediction and class members ordering," which also corresponds to the method disclosed herein and additionally includes the disclosed method of ordering domains corresponding to domain vectors within clusters when determining the order in which to apply classifiers. The last column also includes a "fixed order," sub-column which corresponds to previous methods of applying classifiers which apply classifiers in a fixed order with blocking rules. For the fixed order test run, the classifiers corresponding to different domains were randomly shuffled.

FIG. 17 also indicates the time required to classify the samples in each sample set, as measured per sample (on average), in milliseconds. As shown in FIG. 17, the present system and method offers clearly advantages in speed and efficiency of classification. In particular, previous classification methods take 0.02 milliseconds, on average, to classify a sample data object of unknown type. By contrast, the present system takes 0.006 milliseconds, on average, to classify a sample data object when using intra-domain ordering in addition to domain clustering and sorting of domain clusters based on distance to the data object vector. Additionally, even when using just domain clustering and sorting of domain clusters based on distance to the data object vector, the present system takes 0.008 milliseconds. The present system therefore works at least 2.5 times faster than existing methods that use a fixed or random order of classifiers with blocking rules.

The above results clearly demonstrate advantages of the present system as the average number of classification attempts before a first match is more than 2 times less than if the classifiers are queried sequentially. In a case when the data classes are further ordered within a clustered group, the advantage becomes even more pronounced as the average number of classification attempts becomes more than 3 times less than using the traditional techniques.

The predictive classification ordering step is very efficient: it takes approximately 0.006 msec per sample to identify a classification order (165 msec for 31,595 samples). Since additional ordering of the data objects classes within a clustered group required some additional computing, it takes approximately 0.008 msec per sample to identify a classification order (252 msec for 31,595 samples). For comparison, blocking rules (regular expressions) take on average 0.02 msec per sample for a similar composition of the data objects types.

Additional experimental data indicates that intra-cluster ordering/sorting of domain classifiers corresponding to domain vectors within a cluster offers diminishing returns in performance after the closest domain cluster is processed. More than 90% of successful classifications occur in the first (closest) cluster. Therefore, in an exemplary embodiment, the intra-cluster ordering/sorting of domain classifiers corresponding to domain vectors can optionally be used only for the first (closest) cluster and not utilized for subsequent clusters.

Figure 18:
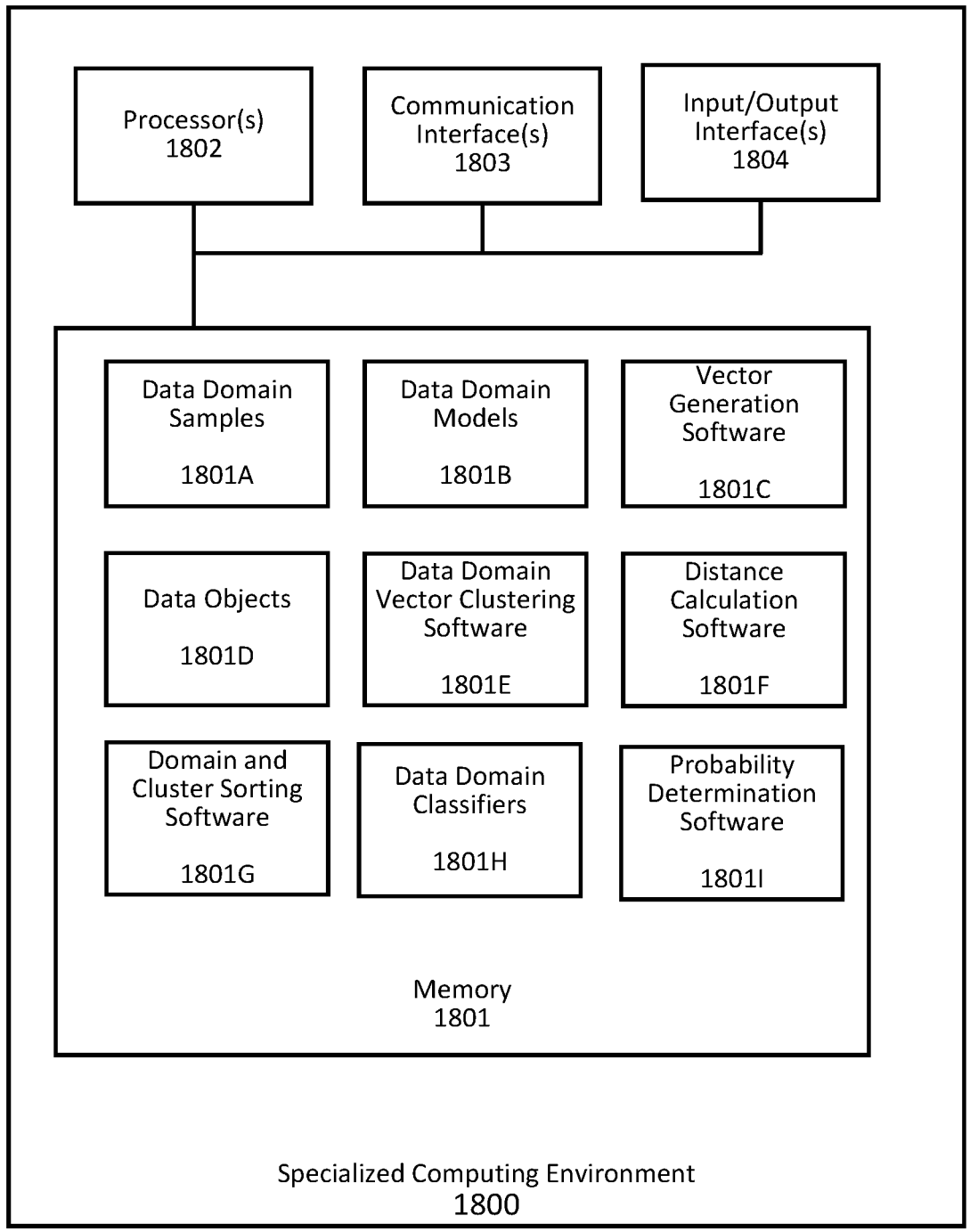
FIG. 18 illustrates the components of a specialized computing environment for efficiently classifying a data object of unknown type according to an exemplary embodiment.

FIG. 18 illustrates the components of the specialized computing environment 1800 configured to perform the processes described herein. Specialized computing environment 1800 is a computing device that includes a memory 1801 that is a non-transitory computer-readable medium and can be volatile memory (e.g., registers, cache, RAM), non-volatile memory (e.g., ROM, EEPROM, flash memory, etc.), or some combination of the two.

As shown in FIG. 18, memory 1801 can include data domain samples 1801A, data domain models 1801B, vector generation software 1801C, data objects 1801D, data domain vector clustering software 1801E, distance calculation software 1801F, domain and cluster sorting software 1801G, data domain classifiers 1801H, and probability determination software 1801I. Each of the software components in memory 1801 store specialized instructions and data structures configured to perform the corresponding functionality and techniques described herein.

All of the software stored within memory 1801 can be stored as a computer-readable instructions, that when executed by one or more processors 1802, cause the processors to perform the functionality described with respect to FIGS. 1-17.

Processor(s) 1802 execute computer-executable instructions and can be a real or virtual processors. In a multi-processing system, multiple processors or multicore processors can be used to execute computer-executable instructions to increase processing power and/or to execute certain software in parallel.

Specialized computing environment 1800 additionally includes a communication interface 1803, such as a network interface, which is used to communicate with devices, applications, or processes on a computer network or computing system, collect data from devices on a network, and implement encryption/decryption actions on network communications within the computer network or on data stored in databases of the computer network. The communication interface conveys information such as computer-executable instructions, audio or video information, or other data in a modulated data signal. A modulated data signal is a signal that has one or more of its characteristics set or changed in such a manner as to encode information in the signal. By way of example, and not limitation, communication media include wired or wireless techniques implemented with an electrical, optical, RF, infrared, acoustic, or other carrier.

Specialized computing environment 1800 further includes input and output interfaces 1804 that allow users (such as system administrators) to provide input to the system to display information, to edit data stored in memory 1801, or to perform other administrative functions.

An interconnection mechanism (shown as a solid line in FIG. 18), such as a bus, controller, or network interconnects the components of the specialized computing environment 1800.

Input and output interfaces 1804 can be coupled to input and output devices. For example, Universal Serial Bus (USB) ports can allow for the connection of a keyboard, mouse, pen, trackball, touch screen, or game controller, a voice input device, a scanning device, a digital camera, remote control, or another device that provides input to the specialized computing environment 1800.

Specialized computing environment 1800 can additionally utilize a removable or non-removable storage, such as magnetic disks, magnetic tapes or cassettes, CD-ROMs, CD-RWs, DVDs, USB drives, or any other medium which can be used to store information and which can be accessed within the specialized computing environment 900.

Applicant has discovered a novel method, apparatus, and computer-readable medium for efficiently classifying a data object of unknown type. As explained above, the disclosed systems and methods are two to three times faster as compared to a traditional approach and achieve a two to three times reduction in the number of classification attempts before successful classification.

The disclosed systems and methods also provides a novel approach to choosing an order in which the data objects' classifiers should be queried and has many additional advantages. In particular, a lightweight data object model is used which can be instantiated both manually and automatically and is not computationally expensive to instantiate. The discloses system and method also allows users and systems to establish a threshold beyond which further classification attempts become irrelevant, saving resources on applying classifiers when the probability of success is low. The disclosed approach also makes blocking rules redundant and simplifies the overall data objects classification architecture. The implementation of the classification order predicting components is also transparent to the existing data objects' classification implementations, making it applicable to data objects of varied types.

Having described and illustrated the principles of our invention with reference to the described embodiment, it will be recognized that the described embodiment can be modified in arrangement and detail without departing from such principles. It should be understood that the programs, processes, or methods described herein are not related or limited to any particular type of computing environment, unless indicated otherwise. Various types of general purpose or specialized computing environments may be used with or perform operations in accordance with the teachings described herein. Elements of the described embodiment shown in software may be implemented in hardware and vice versa.

In view of the many possible embodiments to which the principles of our invention may be applied, we claim as our invention all such embodiments as may come within the scope and spirit of the following claims and equivalents thereto.

The invention claimed is:

1. A method executed by one or more computing devices for efficiently classifying a data object of unknown type, the method comprising:

storing a plurality of data domain vectors corresponding to a plurality of data domain models, each data domain model corresponding to a data object class and each data domain vector comprising a multidimensional vector having a plurality of dimensions, the plurality of dimensions corresponding to a plurality of features of a corresponding data domain model;

generating a data object vector corresponding to the data object, the data object vector comprising a multidimensional vector, with each dimension of the data object vector corresponding to a feature of the data object;

clustering the plurality of data domain vectors into a plurality of data domain clusters;

determining a classification query order corresponding to the data object based at least in part on a distance between the data object vector and one or more data domain clusters in the plurality of data domain clusters, the classification query order specifying an optimal sequence for applying one or more data domain classifiers corresponding to one or more data domain models in the plurality of data domain models to the data object, the optimal sequence being configured minimize a computational cost for classification of the data object.

2. The method of claim 1, wherein determining a classification query order corresponding to the data object based at least in part on a distance between the data object vector and each of one or more data domain clusters in the plurality of data domain clusters comprises:

determining a distance between the data object vector and each of one or more centroids of the one or more data domain clusters in a vector space corresponding to the data object vector and the plurality of data domain vectors; and ranking the one or more data domain clusters based at least in part on the determined distance.

3. The method of claim 2, wherein determining a classification query order corresponding to the data object based at least in part on a distance between the data object vector and each of one or more data domain clusters in the plurality of data domain clusters further comprises:
  identifying a closest data domain cluster based at least in part on the ranking of the one or more data domain clusters;
  determining a distance between the data object vector and each of one or more data domain vectors in the closest data domain cluster; and
  ranking the one or more data domain vectors based at least in part on the determined distance.

4. The method of claim 1, further comprising:
  iteratively applying the one or more data domain classifiers to the data object based at least in part on the classification query order.

5. The method of claim 4, wherein iteratively applying the one or more data domain classifiers to the data object based at least in part on the classification query order comprises:
  determining whether one or more termination conditions are true; and
  iteratively applying the one or more data domain classifiers to the data object based at least in part on the classification query order and a determination that none of the one or more termination conditions are true.

6. The method of claim 5, wherein the one or more termination conditions comprise:
  the data object being classified by a data domain classifier in the one or more data domain classifiers; or
  a subsequent data domain classifier in the one or more data domain classifiers having a probability of successful classification of the data object below a predetermined threshold.

7. An apparatus for efficiently classifying a data object of unknown type, the apparatus comprising:
  one or more processors; and
  one or more memories operatively coupled to at least one of the one or more processors and having instructions stored thereon that, when executed by at least one of the one or more processors, cause at least one of the one or more processors to:
    store a plurality of data domain vectors corresponding to a plurality of data domain models, each data domain model corresponding to a data object class and each data domain vector comprising a multidimensional vector having a plurality of dimensions, the plurality of dimensions corresponding to a plurality of features of a corresponding data domain model;
    generate a data object vector corresponding to the data object, the data object vector comprising a multidimensional vector, with each dimension of the data object vector corresponding to a feature of the data object;
    cluster the plurality of data domain vectors into a plurality of data domain clusters; and
    determine a classification query order corresponding to the data object based at least in part on a distance between the data object vector and one or more data domain clusters in the plurality of data domain clusters, the classification query order specifying an optimal sequence for applying one or more data domain classifiers corresponding to one or more data domain models in the plurality of data domain models to the data object, the optimal sequence being configured minimize a computational cost for classification of the data object.

8. The apparatus of claim 7, wherein the instructions that, when executed by at least one of the one or more processors, cause at least one of the one or more processors to determine a classification query order corresponding to the data object based at least in part on a distance between the data object vector and each of one or more data domain clusters in the plurality of data domain clusters further cause at least one of the one or more processors to:
  determine a distance between the data object vector and each of one or more centroids of the one or more data domain clusters in a vector space corresponding to the data object vector and the plurality of data domain vectors; and
  rank the one or more data domain clusters based at least in part on the determined distance.

9. The apparatus of claim 8, wherein the instructions that, when executed by at least one of the one or more processors, cause at least one of the one or more processors to determine a classification query order corresponding to the data object based at least in part on a distance between the data object vector and each of one or more data domain clusters in the plurality of data domain clusters further cause at least one of the one or more processors to:
  identifying a closest data domain cluster based at least in part on the ranking of the one or more data domain clusters;
  determining a distance between the data object vector and each of one or more data domain vectors in the closest data domain cluster; and
  ranking the one or more data domain vectors based at least in part on the determined distance.

10. The apparatus of claim 7, further storing computer-readable instructions that, when executed by at least one of the one or more computing devices, cause at least one of the one or more computing devices to:
  identify a closest data domain cluster based at least in part on the ranking of the one or more data domain clusters;
  determine a distance between the data object vector and each of one or more data domain vectors in the closest data domain cluster; and
  rank the one or more data domain vectors based at least in part on the determined distance.

11. The apparatus of claim 10, wherein the instructions that, when executed by at least one of the one or more processors, cause at least one of the one or more processors to iteratively apply the one or more data domain classifiers to the data object based at least in part on the classification query order further cause at least one of the one or more processors to:
  iteratively apply the one or more data domain classifiers to the data object based at least in part on the classification query order.

12. The apparatus of claim 11, wherein the one or more termination conditions comprise:
  the data object being classified by a data domain classifier in the one or more data domain classifiers; or
  a subsequent data domain classifier in the one or more data domain classifiers having a probability of successful classification of the data object below a predetermined threshold.

13. At least one non-transitory computer-readable medium storing computer-readable instructions for efficiently classifying a data object of unknown type that, when executed by one or more computing devices, cause at least one of the one or more computing devices to:
  store a plurality of data domain vectors corresponding to a plurality of data domain models, each data domain model corresponding to a data object class and each data domain vector comprising a multidimensional vector having a plurality of dimensions, the plurality of dimensions corresponding to a plurality of features of a corresponding data domain model;

generate a data object vector corresponding to the data object, the data object vector comprising a multidimensional vector, with each dimension of the data object vector corresponding to a feature of the data object;

cluster the plurality of data domain vectors into a plurality of data domain clusters; and determine a classification query order corresponding to the data object based at least in part on a distance between the data object vector and one or more data domain clusters in the plurality of data domain clusters, the classification query order specifying an optimal sequence for applying one or more data domain classifiers corresponding to one or more data domain models in the plurality of data domain models to the data object, the optimal sequence being configured minimize a computational cost for classification of the data object.

14. The at least one non-transitory computer-readable medium of claim 13, wherein the instructions that, when executed by at least one of the one or more computing devices, cause at least one of the one or more computing devices to determine a classification query order corresponding to the data object based at least in part on a distance between the data object vector and each of one or more data domain clusters in the plurality of data domain clusters further cause at least one of the one or more computing devices to:

determine a distance between the data object vector and each of one or more centroids of the one or more data domain clusters in a vector space corresponding to the data object vector and the plurality of data domain vectors; and rank the one or more data domain clusters based at least in part on the determined distance.

15. The at least one non-transitory computer-readable medium of claim 13, wherein the instructions that, when executed by at least one of the one or more computing devices, cause at least one of the one or more computing devices to determine a classification query order corresponding to the data object based at least in part on a distance between the data object vector and each of one or more data domain clusters in the plurality of data domain clusters further cause at least one of the one or more computing devices to:

identify a closest data domain cluster based at least in part on the ranking of the one or more data domain clusters;

determine a distance between the data object vector and each of one or more data domain vectors in the closest data domain cluster; and rank the one or more data domain vectors based at least in part on the determined distance.

16. The at least one non-transitory computer-readable medium of claim 13, further storing computer-readable instructions that, when executed by at least one of the one or more computing devices, cause at least one of the one or more computing devices to:

iteratively apply the one or more data domain classifiers to the data object based at least in part on the classification query order.

17. The at least one non-transitory computer-readable medium of claim 16, wherein the instructions that, when executed by at least one of the one or more computing devices, cause at least one of the one or more computing devices to iteratively apply the one or more data domain classifiers to the data object based at least in part on the classification query order further cause at least one of the one or more computing devices to:

determining whether one or more termination conditions are true; and iteratively applying the one or more data domain classifiers to the data object based at least in part on the classification query order and a determination that none of the one or more termination conditions are true.

18. The at least one non-transitory computer-readable medium of claim 17, wherein the one or more termination conditions comprise:

the data object being classified by a data domain classifier in the one or more data domain classifiers; or a subsequent data domain classifier in the one or more data domain classifiers having a probability of successful classification of the data object below a predetermined threshold.

* * * * *